Patented July 13, 1954

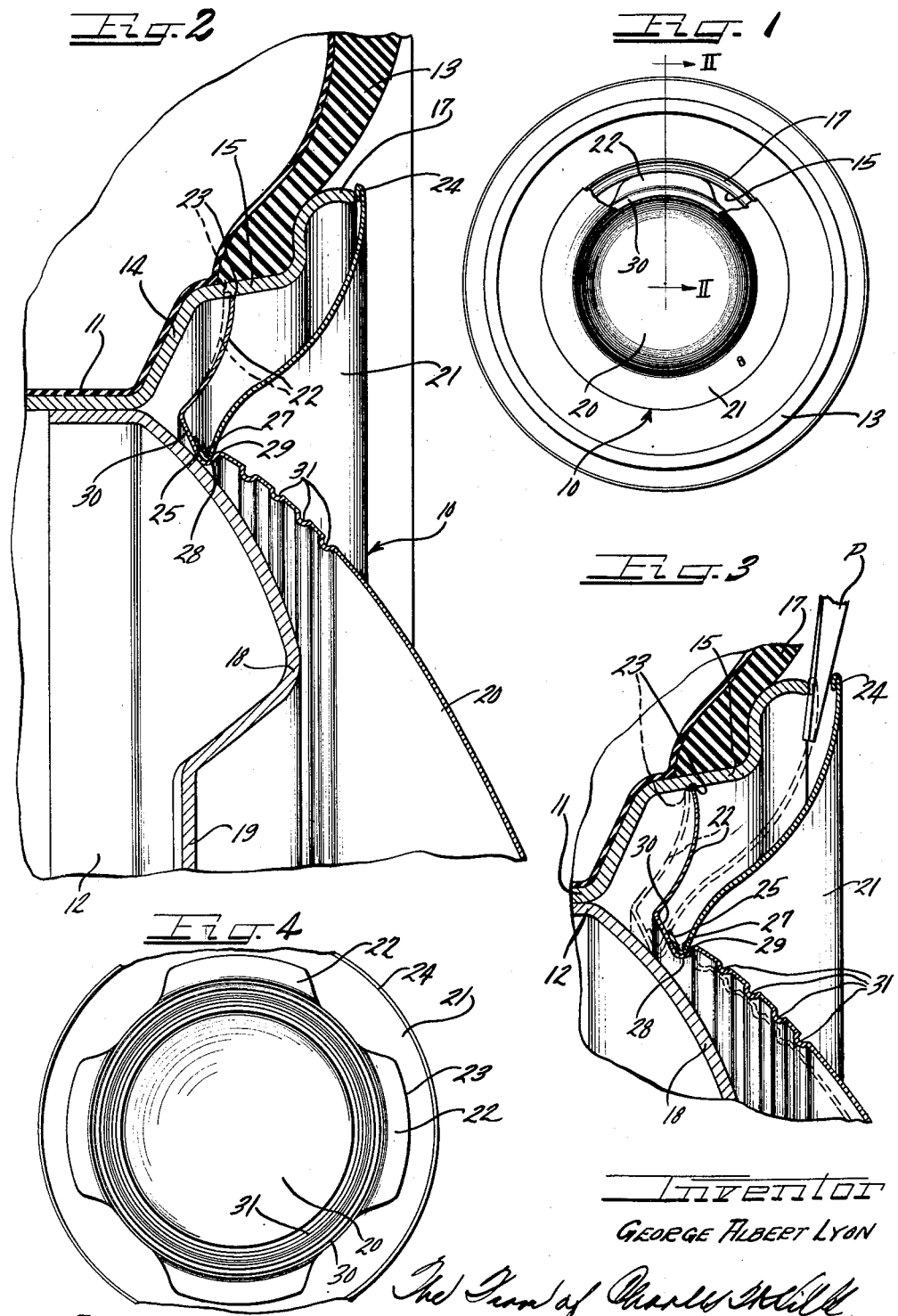

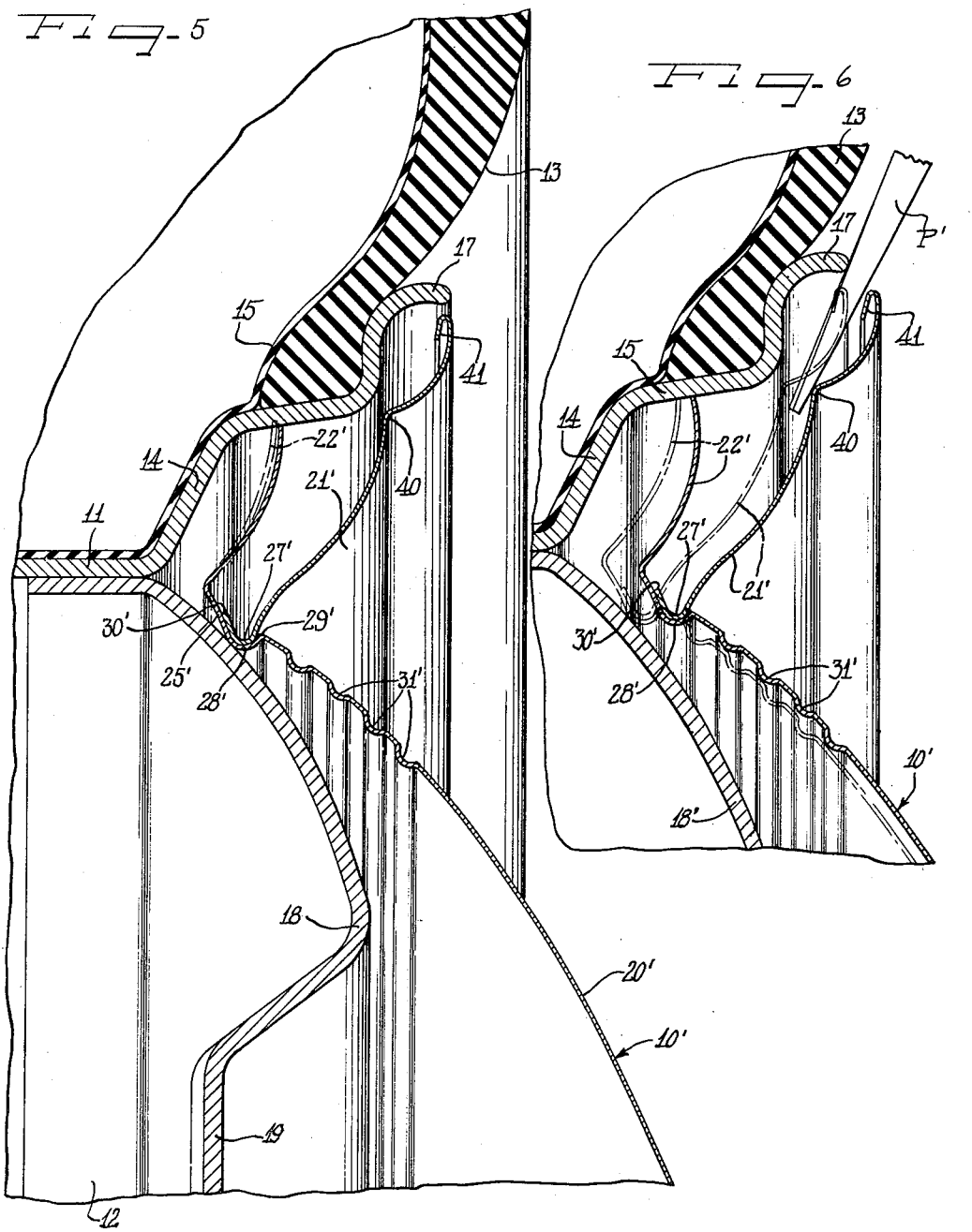

2,683,632

UNITED STATES PATENT OFFICE 2,683,632

WHEEL COVER

George Albert Lyon, Detroit, Mich.

Application June 11, 1952, Serial No. 292,930

12 Claims. (Cl. 301—37)

The present application is a continuation-in-part of my application Serial No. 776,971, filed September 30, 1947, now abandoned.

This application relates to improvements in wheel cover structure, and more particularly concerns a new and improved wheel cover particularly adapted for use on the outer side of a vehicle wheel, such as an automobile.

As a matter of economy and convenience as well as appearance, it is highly desirable to have a wheel cover which as a complete self-contained, self-attachable unit is applicable in full covering relation to the outer side of a vehicle wheel. Such a cover must, however, be of such a character that while it maintains its covering position on the wheel securely resistant to the forces and stresses tending to dislodge it under service conditions and hazards, it nevertheless is readily removable for access to the concealed wheel structure for various well known reasons.

One of the most important problems encountered in the provision of such a cover resides in having the retaining means for the cover of such character as to afford the several desirable attributes in the cover as just referred to above. The problem becomes even more serious when the retaining means for the cover must be entirely self-attaching and retaining without any help from retaining shoulders, grooves, bumps, or other cooperative structural formations, or clips, which will cooperate in retaining the cover on the wheel.

It is, accordingly, an important object of the present invention to provide an improved wheel cover structure including novel means for self-retention of the cover on the wheel, but which permits ready removal and replacement of the cover.

Another object of the invention is to provide an improved wheel cover which is adapted to be readily pressed into self-retaining assembly with a wheel and which is adapted to be easily removed from the wheel by the use of a simple pry-off tool such as a screw driver or the like.

A further object of the invention is to provide an improved wheel cover which is readily adaptable to existing wheels of the multi-flanged tire rim type, with a novel retaining finger arrangement effecting retaining engagement with a flange of the tire rim.

Still another object of the invention is to provide in a self-retaining wheel cover which is adapted to be pressed into position on a wheel and removed by prying the same from the wheel, an improved reinforced structure for successfully withstanding stresses to which the cover is subjected in applying and removing the same, and particularly in pry-off removal of the cover.

According to the general features of the invention there is provided in a wheel cover for application to the outer side of a multi-flanged tire rim type of wheel, a cover member and a plurality of retaining fingers on said cover member arranged for effecting biting retaining engagement with a generally axially disposed flange of the tire rim, said fingers extending generally radially outwardly and being substantially rigidly joined at their inner portions to the cover member, the fingers, or at least certain of the same having the tips thereof permanently biased in the general direction which will facilitate release thereof from the tire rim flange, said fingers being of a radial length initially slightly greater than the diameter of the retainingly engaged portion of the tire rim flange and adapted to enter into stressed retaining engagement with such portion of the tire rim flange, and being responsive to pry-off force applied to the cover to return to and increase the release bias thereof to facilitate removal of the cover from the wheel.

According to other features of the invention, the retaining fingers are permanently curved in opposition to the cover retaining stress to which they are imposed when applied to the wheel.

According to other general features of the invention there is provided in a vehicle wheel cover a circular cover member having a portion engageable with the load sustaining body part of a multi-flanged tire rim type of wheel and with such cover portion disposed adjacent to the juncture of the body part of the wheel with the tire rim, and a plurality of cover retaining fingers joined substantially rigidly to said cover portion and extending generally radially and axially outwardly relative to said cover portion and with the tip portions of the fingers turned in an axially rearward direction but adapted to be placed under stress in engagement with a flange of the tire rim to bring a biting edge at the axially inner side of the tip into retaining engagement with the tire rim flange.

According to yet other features of the invention the retaining figers are adapted to turn further axially rearwardly upon the application of pry-off force to the cover member so that the biting edge of the finger tip is turned out of engagement with the tire rim flange and the finger will slide out of retaining engagement in response to the pry-off force.

Other objects, features and advantages of the present invention will be readily apparent from the following detailed description of a preferred embodiment thereof taken in conjunction with the accompanying drawings, in which:

Figure 1 is a side elevational view of a vehicle wheel including a cover according to the present invention, and with a portion thereof broken away for illustrative purposes;

Figure 2 is an enlarged, fragmentary radial sectional view through the assembly of Fig. 1, taken substantially on the line II—II;

Figure 3 is a fragmentary sectional elevational view conforming generally to Fig. 2 but showing the wheel cover in process of being pried-off;

Figure 4 is a rear elevational view of the cover structure;

Figure 5 is a fragmentary radial sectional view through the wheel, substantially the same as shown in Figure 2 but showing a modified form of the cover on the wheel; and Figure 6 is a fragmentary radial sectional view similar to Figure 5 and showing the cover of Figure 5 in process of being pried free from the wheel.

As shown on the drawings:

A wheel cover 10, according to the present invention, is constructed and arranged to be applied to the outer side of a wheel such as a pneumatically tired automobile wheel, or the like, of existing or preferred structure and comprising a multi-flanged tire rim 11 and a load sustaining body part 12. The tire rim 11 may be formed from suitable sheet metal rolled to trough shape and providing a plurality of stepped, side flanges for supporting a pneumatic tire and tube assembly 13. For this purpose, the tire rim 11 includes at the outer side thereof a side flange 14 which extends generally radially, an intermediate flange 15 which extends generally axially outwardly and is slightly radially outwardly tapered, and a curved terminal flange 17. The wheel body part 12 may be formed as a sheet metal stamping and includes an annular intermediate axially outwardly projecting reinforcing bulge 18 which defines a ridge around a central dished bolt-on flange 19 by which the wheel is secured to an axle part (not shown) of a vehicle.

The wheel cover 10 in the present instance is of a size and construction to cover the entire outer side of the wheel structure and for this purpose comprises a circular inner cover member 20 which is of a diameter to substantially entirely cover the wheel body 12 and is of hub cap general formation, herein formed generally uniformly convex and engaging the wheel body 12 at the radially outer side of the nose bulge 18, preferably adjacent to the juncture of the wheel body with the tire rim. In addition, the cover 10 includes an annular, trim ring portion 21 which is of a radial extent to substantially cover the outer side of the tire rim 11 and is assembled with the inner circular cover member 20 in a permanent self-contained unit.

Both the inner cover member 20 and the trim ring cover member 21 may be formed from suitable gauge sheet metal, the inner cover member being formed as a stamping and the outer cover member being formed either as a stamping or as a rolled section. The outer surfaces of the cover components are adapted to be finished as desired such as in different or contrasting colors or with a lustrous metallic finish, or with a combination of colored and polished, lustrous metallic finish.

One of the cover members is provided with means for attaching the cover to the wheel. Herein such means comprises an annular series of retaining fingers 22 integral with the margin of the inner cover 20 behind the trim ring cover member 21 and adapted for retaining, biting, wedging engagement with the intermediate flange 15 of the tire rim in the assembled relationship of the cover upon the wheel. Although a smaller or greater number of the retaining fingers 22 may be provided, four such fingers, as shown, equally spaced about the periphery of the inner cover member 20 have been found to give satisfactory results.

Each of the retaining fingers 22 extends from the wheel body engaging marginal portion of the inner cover member 20 in a generally radially outward, axially outwardly angled direction, and the tip portions of the fingers are of substantial width and formed on a circle of slightly greater diameter than the diameter of the opposing annular inner surface of the tire rim flange 15 in the area thereof ultimately to be engaged by the finger tips, namely the axially inner portion of the tire rim flange. Thereby, the cover is adapted to be applied to the wheel by pressing the same axially inwardly into position, the retaining fingers 22 being placed under stress generally axially outwardly and radially inwardly upon engaging the inwardly tapering inner portion of the tire rim flange 15. Since the retaining fingers 22 are equidistantly spaced, they will automatically center the cover 10 on the wheel as an incident to pressing the cover home on the wheel. Furthermore since the fingers 22 are individual and thus individually stressed they will readily accommodate relatively wide range of manufacturing tolerances and inaccuracies in the wheel parts.

According to the present invention, the retaining fingers 22 are constructed and arranged to effect automatic, self-retaining engagement with the tire rim flange 15, and to retain a thorough and efficient cover retaining grip upon the tire rim flange, but to be easily and effectively releasable from the tire rim flange in response to pry-off force appropriately applied thereto. For this purpose, at least certain of the retaining fingers 22 are specially formed. Having reference to Fig. 2, the retaining finger 22 has the tip portion thereof normally biased in a generally axially inward direction substantially as indicated in dash outline, this being accomplished by having the finger of curved formation in radial section. However the tip of the finger is at all times, even in the unattached condition of the cover disposed in axially outwardly spaced or offset relation to the base portion of the finger where it joins the margin of the inner cover member 20. Thus, when the finger 22 encounters the smaller diameter axially inner tapering portion of the intermediate tire rim flange 15 in the course of applying the cover to the wheel, the finger is stressed generally radially inwardly and also axially outwardly at its tip portion by flexure thereof, the latter action causing the axially inner edge of the tip thereof, identified at 23 to engage the tire rim flange bitingly and with a wedging retaining action which serves to hold the cover effectively in place on the wheel.

Since the edge 23 bites into the tire rim flange 15, it strongly resists axially outward slippage along the tire rim flange 15 and, in fact, tends to bite even more securely into the tire rim flange in response to forces tending to move the cover axially outwardly relative to the wheel. However, due to the turned formation of the retaining finger 22 a force of sufficient magnitude applied in an axially outward direction to the cover, such as by means of a conventional pry-off tool will ultimately cause the retaining finger 22 to flex intermediately and thus turn the tip thereof, which is held by its biting contact with the tire rim flange 15, until the biting edge 23 releases and is actually tipped radially inwardly out of engagement with the tire rim flange until the opposite edge of the tip engages the rim flange, and now being directed in a generally axially inward direction slides axially outwardly along the rim flange 15 until the cover is released. This action is graphically illustrated in Fig. 3 where the cover is shown in dash outline in its fully assembled relationship with the wheel, and is shown in full outline in partially removed conditions, that is in the condition where the retaining finger 22 is turned or tipped by flexure of the retaining finger for release of the tip thereof from the tire rim flange 15. Immediately after the tip of the retaining finger 22 leaves the tire rim flange 15, the tip portion thereof snaps back to the initial disposition of the retaining finger as shown in the dash outline of Fig. 2.

Since the pry-off force which must be applied for upsetting and releasing the pry-off finger or fingers 22 must be of substantial magnitude, the cover assembly, especially in that portion thereof which is subjected to the immediate exertion of the pry-off force adjacent to the retaining fingers 22 is of a reinforced formation which will adequately and efficiently sustain such force and respond thereto in transmitting the pry-off force to the retaining fingers. Where, as in the present embodiment, the pry-off force is applied as by means of a tool P initially to the trim ring cover portion 21, it follows that initial consideration must be given to adequate rigidity in the trim ring portion. To begin with, a reinforcing underturned outer marginal flange 24 is turned under and provides a stiff outer edge for the trim ring to receive the initial thrust from the pry-off tool P. Further, the cross sectional configuration of the trim ring cover portion 21 is such as to afford adequate stiffness for transmitting the force of the pry-off tool thrust to the inner margin of the trim ring where it engages the inner cover member. To this end the cross sectional shape of the trim ring member is preferably of ogee configuration with the radially outer portion thereof convexly formed and the inner portion concavely formed, thus providing in effect alternate annular large mutually reinforcing ribs. This contour of the trim ring 21 is also calculated to afford general simulation of a radially inner side wall portion of the tire 13, and where of light finish may simulate a white side wall portion of the tire.

At its inner margin the trim ring 21 is formed with an underturned, generally radially outwardly and axially inwardly extending divergent annular reinforcing flange 25 forming at the juncture with the body of the trim ring a relatively sharp, stiff generally radially inwardly extending annular reinforcing bead 27. Thus, the generally convex inner marginal portion of the trim ring together with the reinforcing and stiffening rib 27, together with the reinforcing inner marginal flange 25 renders the other margin of the trim ring quite rigid and resistant to radial or axial distortions. Thereby pry-off force applied by the pry-off tool P to the outer reinforced margin 24 of the trim ring will be transmitted to and through the inner margin of the trim ring with but inconsequential loss due to resilient yielding of the metal of the trim ring.

For effective transmission of the pry-off force from the trim ring 21 to the inner cover member 20, a connection is provided which engages with the inner margin of the trim ring at the axially outer side of the marginal reinforcing rib 27. To this end the marginal portion of the inner cover member 20, adjacent to juncture therewith of the retaining fingers 22 is formed with a reentrant groove 28 opening generally radially outwardly and flanked at its axially outer side by a rib 29 affording a shoulder opposing the contiguous shoulder of the trim ring reinforcing rib 27. Thus, the inner margin of the trim ring 21 is interlockingly nested in the annular groove 28, and the radially inwardly directed rib afforded by the groove 28 and the oppositely directed rib 29 rigidly reinforce the portion of the inner cover member 20 which is engaged by the trim ring.

Extending from the axially inner side of the groove 28 is a generally radially outwardly and axially inwardly oblique flange 30 to which the retaining fingers 22 are integrally joined and against which the inner marginal reinforcing flange 25 of the trim ring seats. The flange 30 is preferably of a width to extend beyond the edge of the flange 25 and reinforces and assists in the flexible action of the retaining fingers 22. As best seen in Fig. 2, the rib afforded by the groove 28 affords an annular seat which bears directly against the wheel body portion 12 and the flange 30 extends at an oblique angle which diverges from the wheel body, thereby affording a substantially line contact with the wheel body and adapting the same for a wide variety of wheel body radial contours.

Additional rigidity in the portion of the inner cover member 20 which must sustain the pry-off forces may be imparted by providing a series of annular corrugations or ribs 31 in the area thereof adjacent to the reinforcing and trim ring retaining rib 29. Thereby the entire margin of the inner cover member 20 for a substantial extent is very strongly reinforced against a tendency to distort in consequence of strong pry-off pressure.

Although the cover has been shown as comprising a two-part assembly including an inner cover member and a trim ring, it is readily apparent that where it is desired to have merely a trim ring embodying the novel self-retaining and self-releasing retaining finger arrangement, that can be readily attained by having the retaining fingers formed on the inner marginal portion of the trim ring or by having a retaining ring structure which would comprise a structure substantially like the outer margin of the inner cover member 20 but omitting the central hub cap simulating portion thereof.

The modification of Figures 5 and 6 is substantially like the form of the invention shown in Figure 2 with the difference to be pointed out hereinafter. Inasmuch as the wheel itself is identical with that shown in Figure 2 the same reference numerals have been applied thereto and it will be understood that the same description applies.

Inasmuch as the modified cover is substantially like the cover 10, corresponding elements of the modified cover have primed reference numerals and it will be understood that the description of such corresponding elements in the cover of Figures 5 and 6 is the same as given for the same elements in the cover of Figure 2 and it will therefore be unnecessary here to repeat a description of such elements.

In Figures 5 and 6 the principal difference resides in that the cover member 21' is additionally reinforced and is provided with an annular inwardly directed reinforcing and pry-off rib 40 adjacent to its outer margin. This pry-off rib is located generally opposite to the juncture shoulder defined between the intermediate flange 15 of the tire rim and the terminal flange 17. Moreover, the cover member 21 is preferably of a smaller outer edge diameter than the inside diameter of the axially outwardly projecting portion of the terminal flange of the tire rim so as to lie within and in clearance gap relation to the extremity of the terminal flange. The edge of the cover member 21' is defined by an underturned reinforcing and pry-off shoulder flange 41 of substantial size.

It will be observed that by the provision of the inwardly directed pry-off rib 40, the remainder of the cover member 21' is formed into a pair of annular outwardly convex ribs of substantial radius alternating with the rib 40 so that the cover member 21 is quite substantially rigidified and reinforced to withstand strong pry-off pressures.

Application of the cover 19' to the wheel is effected in the same manner as described for the cover 19.

For removing the cover 19' from the wheel, a pry-off tool P' is inserted into the gap between the edge of the cover and the terminal flange 17 and preliminary pry-off force applied much the same as shown in Figure 3 for the cover 19. Then the pry-off tool P is inserted further in behind the cover until it engages the reinforcing and pry-off rib 40 as seen in Figure 6. Thereby the leverage distance against which the pry-off tool operates, as related to the fingers 22 is substantially shortened and since the pry-off rib 40 is disposed substantially axially inwardly from the outer edge of the cover, quite effective pry-off force can be exerted against the cover with a minimum leverage movement of the pry-off tool P as fulcrumed on the tire rim terminal flange edge.

Inasmuch as the radially inner portion of the cover 21' is concavely cross-sectioned on its inner side, and the pry-off rib 40 extends substantially axially inwardly, the tip of the pry-off tool will be prevented from engaging in damaging relation against the inner side of the cover in prying the cover from the wheel. It will thus be apparent that not only is the cover substantially reinforced by reason of the pry-off rib 40, but pry-off is substantially facilitated.

It will be understood that modifications and variations may be effected without departing from the scope of the novel concepts of the present invention.

I claim:

1. In a wheel cover for application to the outer side of a multi-flanged tire rim type of wheel, a cover member, and a plurality of retaining fingers on said cover member arranged for effecting biting retaining engagement with a generally axially disposed flange of the tire rim, said fingers extending generally radially outwardly and being substantially rigidly joined at their inner portions to the cover member, at least certain of the fingers having the tips thereof permanently biased in the general direction which will facilitate release thereof from the tire rim flange, said fingers being of a radial length initially slightly greater than the diameter of the retainingly engaged portion of the tire rim flange and adapted to enter into stressed retaining engagement with such portion of the tire rim flange, and being responsive to pry-off force applied to the cover to return to and increase the release bias thereof to facilitate removal of the cover from the wheel.

2. In a vehicle wheel cover, a circular cover member having a portion engageable with the load sustaining body part of a multi-flanged tire rim type of wheel and with such cover portion disposed adjacent to the juncture of the body part of the wheel with the tire rim, and a plurality of cover retaining fingers joined substantially rigidly to said cover portion and extending generally radially and axially outwardly relative to said cover portion and with the tip portions of the fingers turned in an axially rearward direction but adapted to be placed under stress in engagement with a flange of the tire rim to bring a biting edge at the axially inner side of the tip into retaining engagement with the tire rim flange.

3. In a vehicle wheel cover, a circular cover member having a strongly reinforced portion engageable with the load sustaining body part of a multi-flanged tire rim type of wheel and with such cover portion disposed adjacent to the juncture of the body part of the wheel with the tire rim, and a plurality of cover retaining fingers joined substantially rigidly to said cover portion and extending generally radially and axially outwardly relative to said cover portion and with the tip portions of the fingers turned in an axially rearward direction but adapted to be placed under stress in engagement with a flange of the tire rim to bring a biting edge at the axially inner side of the tip into retaining engagement with the tire rim flange, the retaining fingers being adapted to turn further axially rearwardly upon the application of pry-off force to the cover member so that the biting edge of the finger tip is turned out of engagement with the tire rim flange and the finger will slide out of retaining engagement in response to the pry-off force.

4. In a cover for disposition at the outer side of a wheel including a multi-flanged tire rim and a body part, a cover member, said cover member including a portion for substantially covering the tire rim and means for retaining said portion on the wheel including a plurality of retaining fingers extending generally radially and axially outwardly behind said cover portion and bowed in radial cross section with the convex side of the bow directed axially outwardly, the tip of each of the retaining fingers being axially outwardly offset relative to the base portion of the fingers, said base portion of the fingers having rigid juncture with the cover member.

5. In a wheel structure including a wheel body part and a multi-flanged tire rim having an intermediate generally axially outwardly extending outer side flange, a cover for the outer side of the wheel including a generally radially and axially outwardly extending retaining resilient finger having a tip including a biting edge, said retaining finger having the tip portion turned to afford a generally axially inward bias therefor but being so constructed and arranged that said biting edge engages the intermediate flange of the tire rim retainingly, said finger being substantially rigidly joined at its inner end to the cover and being resiliently deflectable in the position thereof radially outwardly from the rigid juncture responsive to the application of pry-off force to upset the finger tip and withdraw said edge from said biting engagement by turning of the finger so that the tip thereof fulcrums on the tire rim flange and assumes a generally axially inward position to release said edge from biting engagement with the tire rim flange and the finger tip can thereby be slid from the retaining engagement by continuation of the application of pry-off force.

6. In a wheel structure including a wheel body part and a multi-flanged tire rim having an intermediate generally axially outwardly extending outer side flange, a cover for the outer side of the wheel including a generally radially and axially outwardly extending retaining resilient finger having a tip including a biting edge, said retaining finger having a tip portion turned to afford a generally axially inward bias therefor but being so constructed and arranged that said biting edge engages the intermediate flange of the tire rim retainingly, said finger being substantially rigidly joined at its inner end to the cover and being resiliently deflectable in the position thereof radially outwardly from the rigid juncture responsive to the application of pry-off force to upset the finger tip and withdraw said edge from said biting engagement by turning of the finger so that the tip thereof fulcrums in the tire rim flange and assumes a generally axially inward position to relieve said edge from biting engagement with the tire rim flange and the finger tip can thereby be slid from the retaining engagement by continuation of the application of pry-off force, said cover having a portion thereof adjacent to the outer edge of the tire rim and adapted to receive pry-off force applied by a pry-off tool interposed between the cover portion and the tire rim edge for transmission to the retaining finger.

7. In a cover for disposition at the outer side of a wheel including a multi-flanged tire rim having an intermediate generally radially and axially outwardly extending flange, a cover member, said cover member including a portion for substantially covering the tire rim and a generally radially and axially extending annular flange behind said portion and substantially fixedly and rigidly connected thereto, said flange having a plurality of retaining fingers extending generally radially and axially outwardly in one piece therefrom behind said cover portion and bowed in radial cross section with the convex side of the bow directed axially outwardly, the tip of each of the retaining fingers being axially outwardly offset relative to said flange and engageable in radially inwardly and axially outwardly stressed relation with the intermediate flange of the tire rim and with the axially inner edges of the fingers engaging the tire rim, said fingers being flexibly turnable upon application of pry-off force to said cover portion so that the biting edges of the finger tips are turned out of engagement with the tire rim intermediate flange and the radially outer edges engage the tire rim intermediate flange and slide out of retaining engagement in the continuance of the pry-off force.

8. In a cover for disposition at the outer side of a vehicle wheel including a wheel body and a multi-flanged tire rim including an intermediate generally radially and axially outwardly extending flange, a crowned cover member having a marginal generally axially outwardly and radially inwardly extending annular flange with a radially outwardly opening groove at juncture of said flange with the remainder of the crowned cover member, a plurality of generally radially and axially outwardly extending cover-retaining fingers projecting in one piece from said flange and bowed convexly with the convex sides projecting generally axially outwardly, said fingers being of a radial extent to engage retainingly under stress against said intermediate flange, and an annular trim ring cover member of compound transverse curvature having the radially inner margin thereof turned axially inwardly and radially outwardly therebehind to provide a relatively sharp reinforcing rib seated retainingly and reinforcingly in said groove, the rigid interconnection between said reinforcing rib and said crowned cover member in said groove enabling pry-off of the cover member by application of pry-off force to said annular member.

9. In a cover for disposition at the outer side of a vehicle wheel, an inner cover member having radially extending retaining fingers engageable with a tire rim, and an annular outer cover member carried by the outer marginal portion of the inner cover member in concealing relation to said fingers and having an intermediate generally axially inwardly extending annular pry-off rib spaced radially inwardly from its outer edge for engagement by a pry-off tool in removing the cover from a wheel to which it may be applied.

10. In a wheel structure including a multi-flange tire rim having an intermediate flange and a terminal flange, a cover for the outer side of the wheel comprising a central disk member having radially extending retaining fingers engageable retainingly with the intermediate flange, and an annular cover member carried by said disk cover member in concealing relation to said retaining fingers and having an intermediate pry-off rib projecting generally axially inwardly and disposed adjacent to juncture of the intermediate and terminal flanges of the tire rim.

11. In a wheel structure including a wheel body and a multi-flange tire rim carried by said wheel body and having side and intermediate flanges with a terminal flange extending from the outer portion of the intermediate flange, a cover for the outer side of the wheel comprising an inner circular portion and an outer circular portion, said inner circular portion overlying the wheel body and the outer circular portion overlying the tire rim substantially inclusive of said terminal flange, said circular cover portions being connected at an annular inwardly directed substantially rigid juncture overlying the wheel body adjacent to juncture of the wheel body and the tire rim, said outer cover portion extending generally radially and axially outwardly from said juncture in substantial spaced relation to said side flange and said intermediate flange and being of annular generally ribbed substantially stiffened cross-section, and a series of highly flexible resilient cover retaining fingers of respectively substantial width and disposed in circumferentially spaced relation and extending generally radially and axially outwardly behind said outer cover portion, said retaining fingers having base portions rigid with one of said cover portions adjacent said rigid juncture so that said base portions are precluded substantially from radial movement relative to said juncture, said fingers having retaining tips engageable in retaining gripping endwise relation with the intermediate flange of the tire rim, said fingers being of a length to extend from the wheel body and in spaced relation across said side flange into said retaining engagement with the intermediate flange and normally extending to a larger diameter than the inside face diameter of the intermediate flange so that the fingers in the retaining engagement are forced under resilient pressure radially inwardly at their tips and the body portions of the fingers intermediate said tips and the bases of the fingers are under bowed resilient stress, said fingers being engageable with the tire rim intermediate flange by pressing the cover axially inwardly into position on the wheel and said finger tips then strongly bitingly resisting axially outward sliding movement along the intermediate flange responsive to pry-off force, said fingers resiliently turning as pry-off leverage is exerted against the cover until the finger tips have turned generally axially rearwardly sufficiently to release their biting engagement on the intermediate flange so that they will slide outwardly as a result of continuation of the pry-off leverage.

12. In a structure as defined in claim 11, said outer cover portion having an annular inwardly directed reinforcing indentation providing a pry-off rib located intermediate said rigid juncture and the radially outer extremity of said outer cover portion.

References Cited in the file of this patent

UNITED STATES PATENTS

| Number | Name | Date |
|---|---|---|
| 1,920,575 | Lyon | Aug. 1, 1933 |
| 2,293,007 | Lyon | Aug. 11, 1942 |
| 2,444,053 | Lyon | June 29, 1948 |

FOREIGN PATENTS

| Number | Country | Date |
|---|---|---|
| 629,134 | Great Britain | Sept. 13, 1949 |